US011903349B2

United States Patent
Murphy

(10) Patent No.: US 11,903,349 B2
(45) Date of Patent: Feb. 20, 2024

(54) SYSTEM OF INTEGRATED PASSAGEWAYS IN A CARBON FIBER BOOM AND METHOD THEREOF

(71) Applicant: DEERE & COMPANY, Moline, IL (US)

(72) Inventor: Patrick M. Murphy, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 784 days.

(21) Appl. No.: 17/021,147

(22) Filed: Sep. 15, 2020

(65) Prior Publication Data

US 2020/0404867 A1    Dec. 31, 2020

Related U.S. Application Data

(62) Division of application No. 15/724,324, filed on Oct. 4, 2017, now Pat. No. 10,806,105.

(51) Int. Cl.
   *B05B 1/14* (2006.01)
   *A01G 25/09* (2006.01)
   (Continued)

(52) U.S. Cl.
   CPC .............. *A01G 25/09* (2013.01); *A01C 23/04* (2013.01); *A01M 7/0042* (2013.01); *A01M 7/0053* (2013.01); *A01M 7/0071* (2013.01); *B05B 1/083* (2013.01); *B05B 1/14* (2013.01); *B29C 70/446* (2013.01); *B32B 3/20* (2013.01); *A01M 7/0075* (2013.01); *A01M 7/0078* (2013.01); *B05B 1/20* (2013.01); *Y10T 137/8807* (2015.04)

(58) Field of Classification Search
   CPC .. B05B 1/14; B32B 5/26; B32B 5/024; B32B 3/08; B32B 3/30; B32B 3/20; A01G 25/09; B29C 70/446; A01M 7/0071
   See application file for complete search history.

(56) References Cited

U.S. PATENT DOCUMENTS 2,976,647 A    3/1961    Pickrell
3,055,594 A    9/1962    Nansel
(Continued)

FOREIGN PATENT DOCUMENTS

CN    201357910 Y    12/2009
EP    0209475 A1    1/1987
(Continued)

OTHER PUBLICATIONS

European Search Report, European Patent Office, European Patent Application No. 18197950, dated Feb. 19, 2019, 12 pages.
(Continued)

*Primary Examiner* — Joseph A Miller, Jr.
(74) *Attorney, Agent, or Firm* — Taft Stettinius & Hollister LLP; Stephen F. Rost

(57) ABSTRACT

A spray boom includes a body having a length defined a first end and a second end thereof. The body is formed by a plurality of layers of composite material adapted to be molded together to form an inner surface and an outer surface. A hollow cavity is defined in the body internally of the inner surface, and a channel is formed in the body between the inner surface and the outer surface. The channel extends along the length and is defined between the first end and the second end.

20 Claims, 5 Drawing Sheets

(51) Int. Cl.
*A01M 7/00* (2006.01)
*B05B 1/08* (2006.01)
*A01C 23/04* (2006.01)
*B32B 3/20* (2006.01)
*B29C 70/44* (2006.01)
*B05B 1/20* (2006.01)

(56) References Cited

U.S. PATENT DOCUMENTS

| | | | |
|---|---|---|---|
| 3,087,581 | A | 4/1963 | Pitman |
| 3,412,761 | A | 11/1968 | Verrell et al. |
| 3,447,750 | A | 6/1969 | Weston |
| 3,550,854 | A | 12/1970 | Fischer |
| 3,580,505 | A | 5/1971 | Loeffler |
| 3,581,993 | A | 6/1971 | Reams |
| 4,662,587 | A | 5/1987 | Whitener |
| 4,711,398 | A | 12/1987 | Ganderton et al. |
| 4,784,324 | A | 11/1988 | DeWitt et al. |
| 5,238,716 | A | 8/1993 | Adachi |
| 5,653,389 | A | 8/1997 | Henderson et al. |
| 6,293,475 | B1 | 9/2001 | Sobolik |
| 6,367,712 | B1 | 4/2002 | Larsen |
| 6,422,483 | B1 | 7/2002 | Yocom et al. |
| 6,586,084 | B1 | 7/2003 | Paschke et al. |
| 6,655,633 | B1 | 12/2003 | Chapman, Jr. |
| 6,698,451 | B2 | 3/2004 | Anderson et al. |
| 6,719,009 | B1 | 4/2004 | Bissen et al. |
| 6,755,212 | B1 | 6/2004 | Anderson et al. |
| 6,786,233 | B1 | 9/2004 | Anderson et al. |
| 6,842,119 | B2 | 1/2005 | Nurse et al. |
| 7,063,763 | B2 | 6/2006 | Chapman, Jr. |
| 7,128,094 | B2 | 10/2006 | Anderson et al. |
| 7,502,665 | B2 | 3/2009 | Giles et al. |
| 7,781,039 | B2 | 8/2010 | Anderson et al. |
| 8,708,171 | B2 | 4/2014 | Schmidt et al. |
| 8,899,496 | B2 | 12/2014 | Wissler et al. |
| 9,265,193 | B2 | 2/2016 | Snyder et al. |
| 9,795,079 | B2 | 10/2017 | Roberge et al. |
| 9,822,535 | B2 | 11/2017 | Maini et al. |
| 2002/0162624 | A1* | 11/2002 | Ebert ............... B29C 70/34 156/254 |
| 2003/0146346 | A1* | 8/2003 | Chapman, Jr. ........ B29C 65/56 244/123.3 |
| 2006/0032701 | A1 | 2/2006 | Linsmeier et al. |
| 2006/0032702 | A1 | 2/2006 | Linsmeier et al. |
| 2012/0273590 | A1 | 11/2012 | Honermann et al. |
| 2015/0223393 | A1 | 8/2015 | Mansfield |
| 2015/0298402 | A1 | 10/2015 | Li et al. |
| 2016/0038961 | A1 | 2/2016 | Carlson et al. |
| 2016/0178422 | A1 | 6/2016 | Humpal et al. |
| 2016/0262371 | A1 | 9/2016 | Hiddema et al. |
| 2016/0286781 | A1 | 10/2016 | Mariani et al. |
| 2016/0368011 | A1 | 12/2016 | Feldhaus et al. |
| 2018/0087565 | A1 | 3/2018 | Tortorella et al. |

FOREIGN PATENT DOCUMENTS

| | | |
|---|---|---|
| EP | 1468605 A1 | 10/2004 |
| EP | 2984927 A1 | 2/2016 |
| EP | 3066922 A1 | 9/2016 |
| WO | WO2015062964 A1 | 5/2015 |

OTHER PUBLICATIONS

Brazilian Office Action issued in Patent Application No. 1020180703064, dated Apr. 27, 2022, in 05 pages.

Extended European Search Report and Written Opinion issued in European Patent Application No. 21165135.1, dated Jul. 8, 2021, in 13 pages.

* cited by examiner

SYSTEM OF INTEGRATED PASSAGEWAYS IN A CARBON FIBER BOOM AND METHOD THEREOF

CROSS-REFERENCE TO RELATED APPLICATION

This application is a divisional application of, and claims priority to, U.S. application Ser. No. 15/724,324 entitled "SYSTEM OF INTEGRATED PASSAGEWAYS IN A CARBON FIBER BOOM AND METHOD THEREOF," which was filed on Oct. 4, 2017. That application is incorporated by reference herein in its entirety.

FIELD OF THE DISCLOSURE

The present disclosure relates to a boom, and in particular, to a carbon fiber boom designed with integrated channels and passageways.

BACKGROUND

Agricultural equipment and work machines may include a boom mounted to a chassis or frame. The boom may be pivotally mounted at one end with one or more implements coupled thereto. Hydraulic lines, electrical wires, plumbing and other pipes, tubes, wires, and the like are routed to various locations along the boom. A self-propelled sprayer, for example, may include a boom with a plurality of nozzles disposed along the length of the boom for performing a spraying operation. In a conventional steel boom, the wires, pipes, hydraulic lines, and the like are routed externally along the boom and coupled thereto via fasteners or other coupling means.

The externally mounted wires, pipes, plumbing, etc. can add weight to the boom, and in some instances, may get damaged due to their exposure to the outside environment. In addition, these also obstruct the view of an operator while operating the work machine and boom. Thus, a need exists for improving conventional routing of wires, pipes, hydraulic lines, plumbing, and the like along booms. The present disclosure provides one or more embodiments of a system and process for providing an improved boom system.

SUMMARY

In one embodiment of the present disclosure, a spray boom includes a body having a length defined a first end and a second end thereof, the body formed by a plurality of layers of composite material adapted to be molded together to form an inner surface and an outer surface; a hollow cavity defined in the body internally of the inner surface; and a channel formed in the body between the inner surface and the outer surface, the channel extending along the length and defined between the first end and the second end.

In one example of this embodiment, the boom may include a first thickness and a second thickness, the first thickness defined between inner surface and the outer surface at a location absent the channel, and a second thickness defined between the inner surface and the outer surface at a location of the channel, where the second thickness is greater than the first thickness. In a second example, the spray boom may include a second channel formed in the body between the inner surface and the outer surface, the second channel extending along the length and defined between the first end and the second end. In a third example, the first channel and the second channel are spaced circumferentially from one another about the body. In a fourth example, the composite material defined between the first and second channels includes a first width, the first channel comprises a second width, and the second channel comprises a third width, wherein the first width is greater than the second and third widths.

In a fifth example, the spray boom may include a manifold coupled to either the first or second end of the body, wherein the manifold includes a connector located proximate to and in communication with the channel when coupled to the body. In a sixth example, a member is disposed in the channel between the first end and the second end, the member configured to electrically, hydraulically or pneumatically couple the first end to the second end. In another example of this embodiment, the spray boom may include a hollow member disposed in the channel between the first surface and the second surface, the hollow member extending along the length and being at least partially open at the first end and the second end.

In another embodiment of the present disclosure, a method of manufacturing a carbon fiber boom includes providing a first boom mold and a second boom mold; placing at least a first layer of composite material in the first boom mold and the second boom mold; adding at least a second layer of composite material in the first boom mold and the second boom mold; forming an elongated channel in between the at least first layer and the at least second layer of composite material in one of the first boom mold and the second boom mold; pressurizing the first and second molds to compress the at least first and second layers together; assembling the first and second molds together to form a single mold assembly; and applying heat pressure to the single mold assembly to form the carbon fiber boom.

In one example of this embodiment, the method may further include forming a second elongated channel in between the at least first and second layers at a location spaced circumferentially from the first channel. In a second example, the forming step includes inserting a hollow tube between the at least first and at least second layers. In a third example, the method may include depositing a plurality of layers of composite material in the first and second booms; and forming one or more channels between any two of the plurality of layers.

In a fourth example, a second of the plurality of layers is formed between a third layer of composite material and a fourth layer of composite material, where the third and fourth layers are different from the first and second layers. In a fifth example, the method may include compressing the layers together and dispersing resins during the pressurizing step. In a sixth example, the method may include adding layers to the first and second molds after the pressurizing step; and repeating the pressurizing step to compress the additional layers together. In another example, the method may include routing a member through the channel after the applying step, wherein the member electrically, hydraulically or pneumatically couples a first end of the carbon fiber boom to a second end thereof. In a further example, the method may include fabricating a thickness of the carbon fiber boom between an inner surface and outer surface thereof, the thickness being greater at a location of the channel formed in the boom from the thickness at a location free of the channel.

In a further embodiment of the present disclosure, a spray boom assembly includes a first boom frame comprising a body having a length defined a first end and a second end thereof, the body formed by a plurality of layers of composite material adapted to be molded together to form an inner surface and an outer surface; a second boom frame comprising a body having a length defined a first end and a second end thereof, the body formed by a plurality of layers of composite material adapted to be molded together to form an inner surface and an outer surface of the second boom frame; a first channel formed in the body of the first boom frame between the inner surface and the outer surface, the first channel extending along the length and defined between the first end and the second end of the first boom frame; and a second channel formed in the body of the second boom frame between the inner surface and the outer surface, the second channel extending along the length and defined between the first end and the second end of the second boom frame; wherein, the second end of the first boom frame and the first end of the second boom frame are pivotally coupled to one another.

In one example of this embodiment, the spray boom assembly may include a jumper member coupled between the first channel and the second channel to electrically, hydraulically, or pneumatically couple the first end of the first boom frame to the second end of the second boom frame. In another example, the spray boom assembly may include a first manifold coupled to the second end of the first boom frame, the first manifold including a first connector adapted to be in communication with the first channel; a second manifold coupled to the first end of the second boom frame, the second manifold including a second connector adapted to be in communication with the second channel; and a linking member coupled between the first connector and the second connector to electrically, hydraulically, or pneumatically couple the first end of the first boom frame to the second end of the second boom frame.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
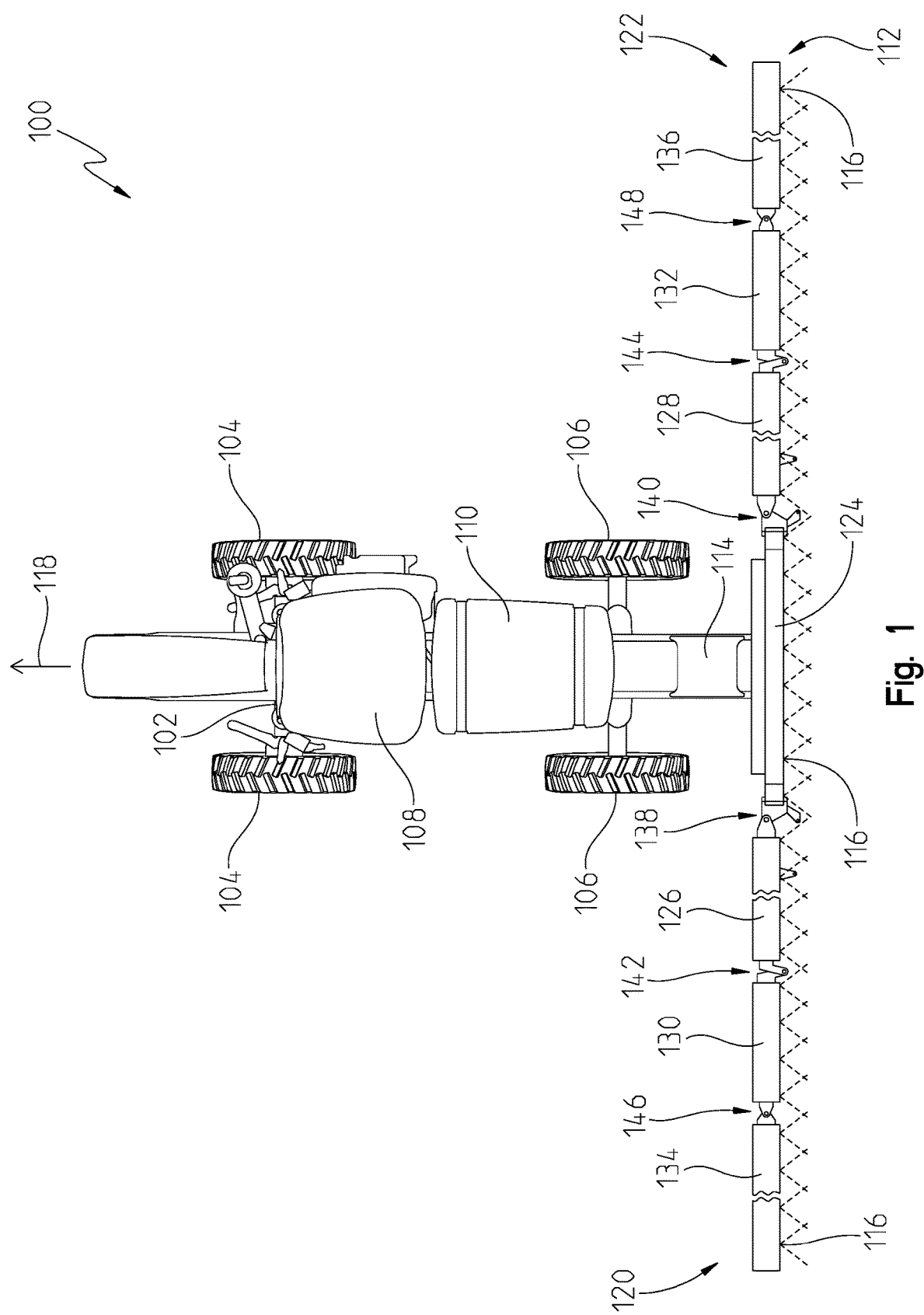
FIG. 1 is a top view of a sprayer system attached to a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, an example of a vehicle carrying a spray boom with spray nozzles mounted on the boom. The vehicle may be a platform or dolly for industrial spray applications or a tractor towing ground-engaging tillage left/right wings with disks and shanks, or a planter towing a row of seed dispenser modules. In the illustrated embodiment of FIG. 1, the vehicle is a towed sprayer or a self-propelled agricultural sprayer 100 including a vehicle main frame 102 and an attached autonomous control station or an operator cab 108 for controlling the sprayer 100. The main frame 102 may be supported by a plurality of ground-engaging mechanisms. In FIG. 1, a pair of front wheels 104 and a pair of rear wheels 106 support the main frame and may propel the vehicle in at least a forward travel direction 118. A tank 110 may be mounted to the frame 102 or another frame (not shown) which is attached to the main frame 102. The tank 110 may contain a spray liquid or other substance to be discharged during a spraying operation.

A fixed or floating center frame 114 is coupled to a front or a rear of the main frame 102. In FIG. 1, the center frame 114 is shown coupled to the rear of the main frame 102. The center frame 114 may support an articulated folding spray boom assembly 112 that is shown in FIG. 1 in its fully extended working position for spraying a field. In other examples, the spray boom assembly 112 may be mounted in front of the agricultural sprayer 100.

A plurality of spray nozzles 116 can be mounted along a fluid distribution pipe or spray pipe (not shown) that is mounted to the spray boom assembly 112 and fluidly coupled to the tank 110. Each nozzle 116 can have multiple spray outlets, each of which conducts fluid to a same-type or different-type of spray tip. The nozzles 116 on the spray boom assembly 112 can be divided into boom frames or wing structures such as 124, 126, 128, 130, 132, 134, and 136 (or collectively "spray section(s)"). In FIG. 1, the plurality of groups or sections may include a center boom frame 124 which may be coupled to the center frame 114. Although not shown in FIG. 1, a lift actuator may be coupled to the center frame 114 at one end and to the center boom frame 124 at the opposite end for lifting or lowering the center boom frame 124.

The spray boom assembly 112 may be further divided into a first or left boom 120 and a second or right boom 122. In FIG. 1, the first boom 120 is shown on a left side of the spray boom assembly 112, and the second boom 122 is depicted on the right side thereof. In some instances, a left-most portion of the center boom frame 124 may form part of the first boom 120 and a right-most portion may form part of the second boom 122. In any event, the first boom 120 may include those boom frames which are disposed on a left-hand side of the spray boom assembly 112 including a first inner boom frame 126 (or commonly referred to as a "left inner wing"), a first outer boom frame 130 (or commonly referred to as a "lift outer wing"), and a first breakaway frame 134. Similarly, the second boom 122 may include those boom frames which are disposed on a right-hand side of the spray boom assembly 112 including a second inner boom frame 128 (or commonly referred to as a "right inner wing"), a second outer boom frame 132 (or commonly referred to as a "right outer wing"), and a second breakaway frame 136. Although seven boom frames are shown, there may any number of boom frames that form the spray boom assembly 112.

As shown in FIG. 1, the first boom frame 126 may be pivotally coupled to the center boom frame 124 at a first hinge location 138 via any known mechanical coupling. Other means for coupling the first boom frame 126 to the center boom frame 124 at the first hinge location 138 may be used. Similarly, the first outer boom frame 130 may be pivotally coupled to the first inner boom frame 126 at a third hinge location according to known means, and the first breakaway frame 134 may be coupled to the first outer boom frame 130 at a fifth hinge location according to known means. In alternative cases, these connections may be rigid connections, whereas in other embodiments such as the one in FIG. 1 the frames may be pivotably coupled to one another. Moreover, the second inner boom frame 128 may be coupled to the center boom frame 124 at a second hinge location 140, and the second outer boom frame 132 may be coupled to the second inner boom frame 128 at a fourth hinge location 144. Likewise, the second breakaway frame 136 may be coupled to the second outer boom frame 136 at a sixth hinge location 148. These couplings may be pivotal connections or rigid connections depending upon the type of boom. Any known or conventional type of coupling mechanism may be used for pivotally or rigidly coupling adjacent boom frames to one another.

In a conventional spray boom assembly, a tilt actuator may be provided for tilting each boom with respect to the center frame. In FIG. 1, for example, a first tilt actuator may be coupled at one end to the center frame 114 or the center boom frame 124, and at an opposite end to the first boom 120. During operation, the first boom 120 may be pivoted with respect to the center frame 114 or center boom frame 124 such that the first breakaway frame 134 may reach the highest point of the first boom 120. This may be useful if the sprayer 100 is moving in the travel direction 118 and an object is in the path of the first boom 120 such that the tilt actuator (not shown) may be actuated to raise the first boom 120 to avoid contacting the object. The same may be true of the second boom 122. Here, a second tilt actuator (not shown) may be actuated to pivot the second boom 122 with respect to the center frame 114 or the center boom frame 124.

Figure 2:
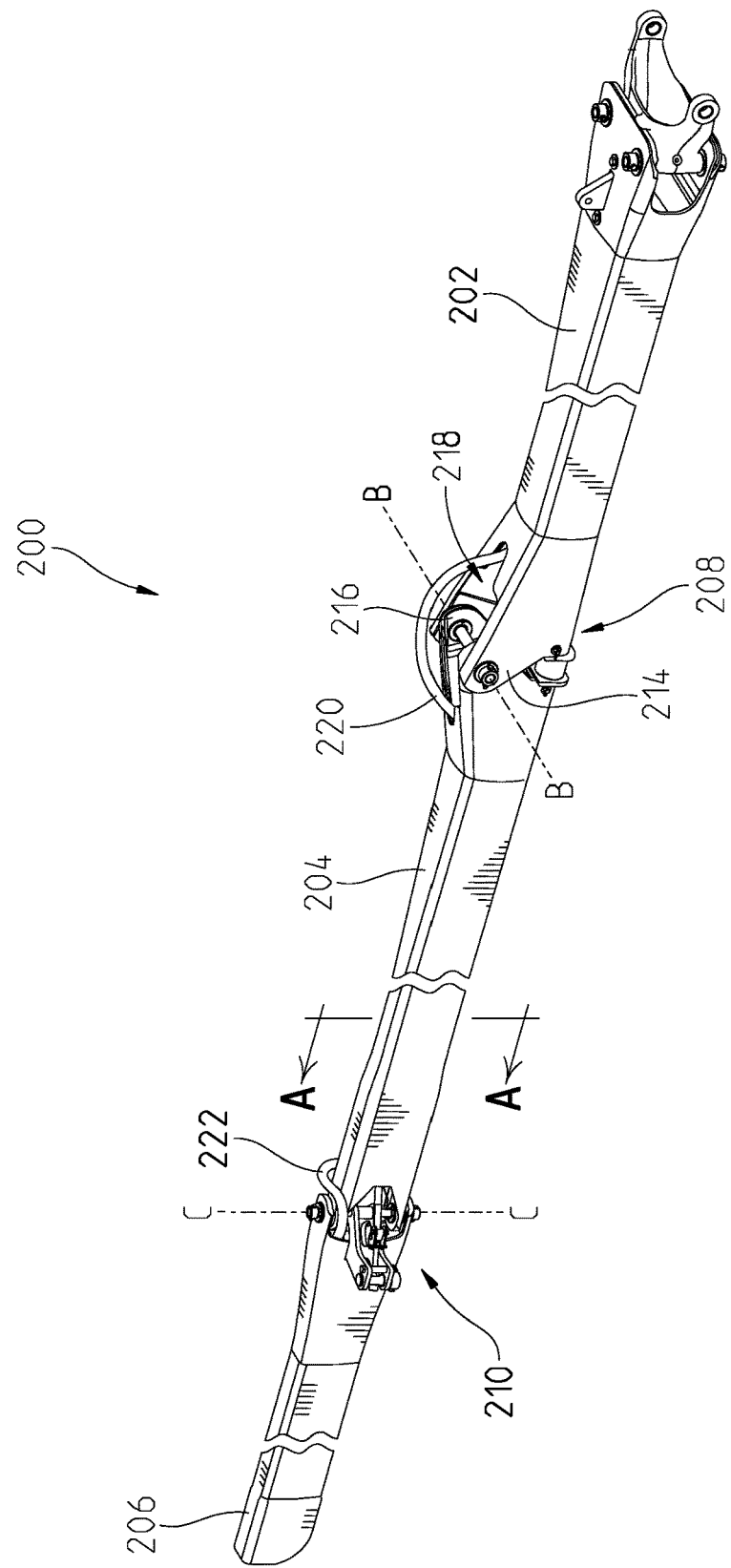
FIG. 2 is a perspective view of a portion of a spray boom.

Referring to FIG. 2, an embodiment of a portion of a carbon fiber boom 200 is shown. The boom 200 is shown as including a first boom frame 202, a second boom frame 204, and a third boom frame 206. The first boom frame 202 may be similar to the first inner wing or boom frame 126 of FIG. 1, while the second boom frame 204 may be similar to the first outer wing or boom frame 130 and the third boom frame 206 may be similar to the breakaway mechanism 134. In any event, the boom frames may be pivotally or rigidly coupled to one another.

In FIG. 2, the boom frames are shown as being pivotally coupled to one another. For instance, the first boom frame 202 may be pivotally coupled to the second boom frame 204 at a first hinge location 208 such that the two frames are able to pivot about a pivot axis B-B. Similarly, the second boom frame 204 and third boom frame 206 may be pivotally coupled to one another at a second hinge location 210 about a second pivot axis C-C. Any known type of coupling means may be used for pivotally coupling adjacent boom frames to one another.

The first boom frame 202 may include a yoke or other means for coupling to a center frame or other structure of a boom system. Moreover, the first boom frame 202 is shown having an ear or protruding portion 214 for pivotally coupling to an ear or protruding portion 216 of the second boom frame 204. As shown, a fastener or other coupling means may pivotally couple the protruding portions to one another to permit pivotal movement therebetween. The same type of design or structure may be incorporated to allow pivotal movement between the second boom frame 204 and the third boom frame 206.

As shown in FIG. 2, an opening 218 or space is defined at the first hinge location 208 between the first boom frame 202 and the second boom frame 204. The opening 218 may be sized to allow a hose or cable 220 to pass from inside the first boom frame 202 to inside the second boom frame 204. The same may be true of a second hose or cable 222 which passes between the second boom frame 204 and the third boom frame 206. Each cable or hose may be used to transfer hydraulic fluid from a fluid tank or reservoir to each nozzle located along the entire length of the boom 200. Since the boom frames pivot relative to one another, each hose or cable may have a degree of flexibility to allow for the pivotal movement.

If the cable is an electrical cable or wire, it may allow for electrically coupling a sensor (not shown) or other electrical component on the different boom frames to a controller or other electrical component. For example, there may be a position sensor or global positioning sensor located at the end of the third boom frame 206. This sensor may be in communication with a controller for controlling the position and movement of the boom 200. Since the carbon boom 200 in FIG. 2 is designed without any external wires, cables, plumbing, etc., the cables 218, 220 allow for communication (either electrical or hydraulic) to exist between adjacent boom frames. Thus, these cables serve as jumper cables in the sense they couple wires, cables, hoses, plumbing, etc. between the different boom frames. While a cable is shown in FIG. 2, other means may be used for achieving the same function.

For purposes of this disclosure, a linking member or coupling member may be used throughout for describing hydraulically, electrically, or pneumatically coupling one end of the boom frame to the other end. In FIG. 2, the linking member may also take the form of the cables 218, 220 which effectively hydraulically, electrically, or pneumatically coupled adjacent boom frames to one another. Through the use of one or more linking members, electrical signals, pneumatic fluid, or hydraulic fluid may be transferred between boom sections along the entire boom 120, 122 without the use of an external hose, wire, or the like. Similarly, a linking member may be routed through internal channels or passageways defined in the carbon fiber boom as will be described below with respect to FIGS. 3 and 4.

Although not shown in FIG. 2, it is further possible that each end of a respective boom frame may include a manifold. The manifold may encapsulate entirely or only partially cover each end of the respective boom frame. The manifold may include connectors for coupling fluid hoses, pipes, wires, and the like between boom frames. For example, the first boom frame 202 may include a manifold at its end closest to the second boom frame 204, and the second boom frame 204 may include a manifold at its end closest to the first boom frame 202. In this example, a jumper cable, hose or wire similar to those shown in FIG. 2 may be used to couple the two boom frames by coupling at its respective ends to the two manifolds. In this way, the manifold may prevent dirt, water, dust, rocks, or other contaminants from getting disposed internally of each boom frame. The manifold may have a design similar to that of each boom frame. The manifold may be welded, formed, adhered, or coupled in any known manner to the boom frame including via a mechanical fastener or fasteners.

While the coupling of a plurality of boom frames is shown in FIG. 2 and described above, in FIG. 3 a cross-sectional view taken along line A-A of FIG. 2 is shown. Here, a cross-sectional view of a boom frame 300 is shown. In this embodiment, the boom frame 300 is shown as including an outer surface 302 and an inner surface 304. The boom frame 300 may be substantially hollow as shown by the defined internal cavity 306. Although not shown, it may be possible to route electrical wiring, hydraulic lines or pipes, or other components through the internal cavity 306 of the boom frame 300.

As described above, the carbon fiber boom frame 300 may be formed by a plurality of layers. Here, the boom frame 300 may be formed by a first layer 308, a second layer 310, a third layer 312, a fourth layer 314, and a fifth layer 316. The first layer 308 may be the innermost layer of material forming the boom frame 300, whereas the fifth layer 316 may be the outermost layer of material. While only five layers are shown and described with respect to this embodiment, it is within the scope of this disclosure that the carbon fiber boom frame 300 may be formed by any number of layers necessary to achieve a desired thickness, $t_1$. The layers may, for example, be carbon fiber or fiberglass sheets or layers of material. As will be describe below, the layers or sheets may form the carbon fiber boom via a hand-laying process or other known process. Each layer may include the same material as the other layers, or in some embodiments, one or more layers may comprise a different type of material from the other layers. Once the layers are stacked upon one another, the thickness, $t_1$, of the boom frame 300 is formed.

Figure 3:
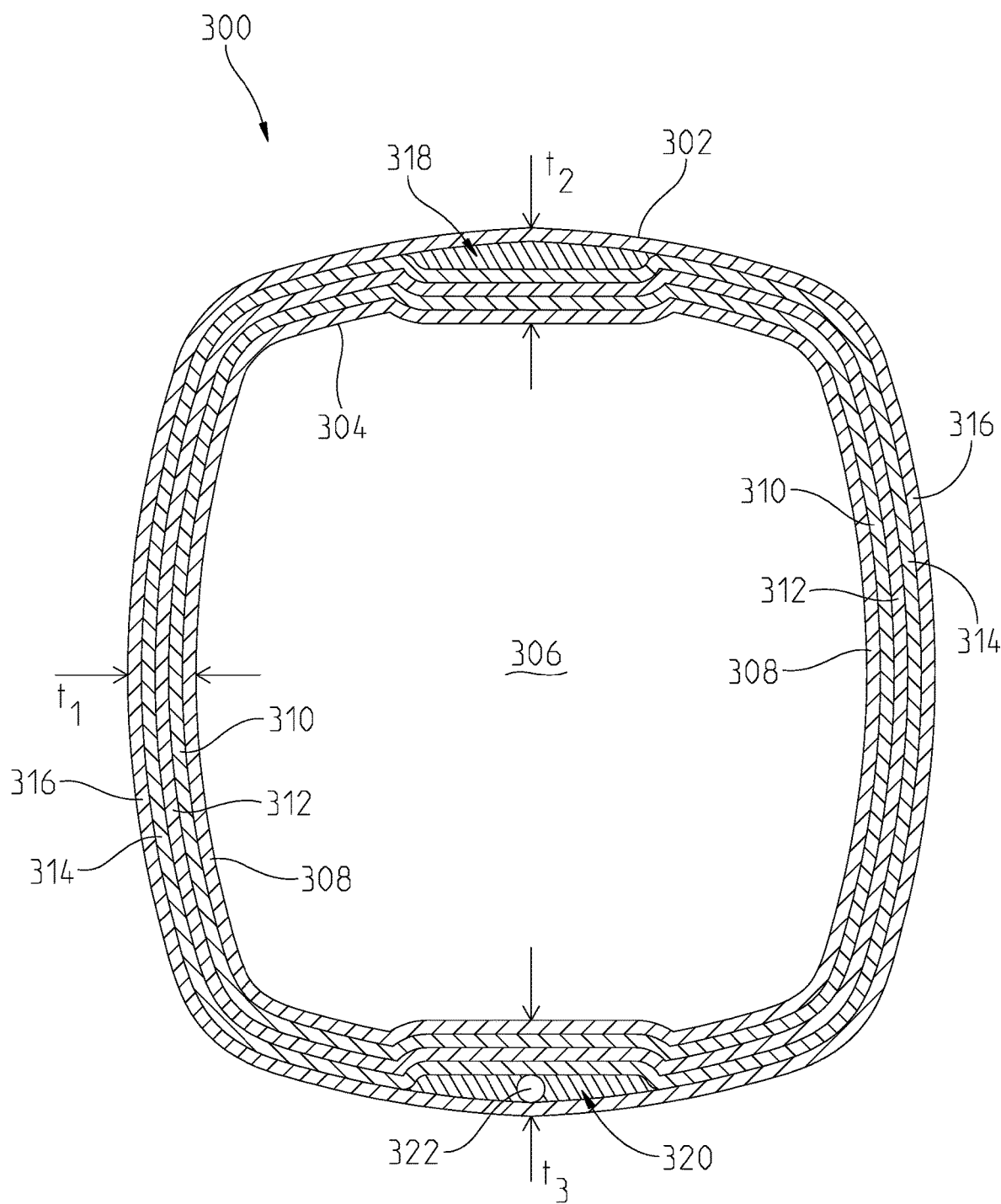
FIG. 3 is a cross-sectional view of one embodiment of the spray boom taken along line A-A of FIG. 2.

In FIG. 3, the embodiment of the boom frame 300 is also shown with additional features formed between the plurality of layers. For example, a first passageway or channel 318 is defined at one location of the boom frame 308. This passageway or channel 318 may be formed through the entire length of the boom frame to allow a linking member (e.g., wiring, piping, or other electrical, hydraulic or pneumatic lines) to be routed internally of the outer layer 302 of the boom frame 300.

A second passageway or channel 320 may be formed at another location in the boom frame 300. This second passageway or channel 320 may also be formed along the entire length of the boom frame 300, and as shown, a linking member 322 (e.g., wiring, piping, or other electrical, hydraulic or pneumatic lines) may be routed through the passageway or channel 320. In one example, the linking member 322 may include a hydraulic hose that supplies a liquid substance from a tank to one or more nozzles located on the boom frame 300. In another example, the linking member 322 may include an electrical wire or cable that electrically couples a sensor to a main controller for controlling a boom height. Other examples are possible with this configuration.

Moreover, while only two passageways are shown, it is within the scope of this disclosure that any number of passageways or channels may be formed inbetween layers of the boom frame 300. In FIG. 3, the passageways or channels are formed between the fourth layer 314 and the fifth layer 316. This is only shown as an example, and it is contemplated that the passageways or channels may be formed between any two layers. In one example, it may be desirable to form the channel or passageway at a location where at least two or more layers are formed on both the inside and outside of the channel or passageway. In other words, it may be desirable to have a thickness of layers on the outside of the channel or passageway to be the same or similar to a thickness of layers on the inside of the channel or passageway.

As also shown in FIG. 3, the thickness of the boom frame 300 may be greater in the location of each formed passageway and channel. For example, at the location of the first passageway or channel 318, the thickness, $t_2$, may be greater than the overall thickness, $t_1$, of the boom frame 300. Similarly, at the location of the second passageway or channel 320, the thickness, $t_3$, may be greater than the overall thickness, $t_1$, of the boom frame 300. In one non-limiting example, the thickness at each location of a passageway or channel may be approximately 1.5 to 2 times the thickness of the rest of the boom frame 300. This may differ in other embodiments, and particularly with respect to different boom frame designs.

Figure 4:
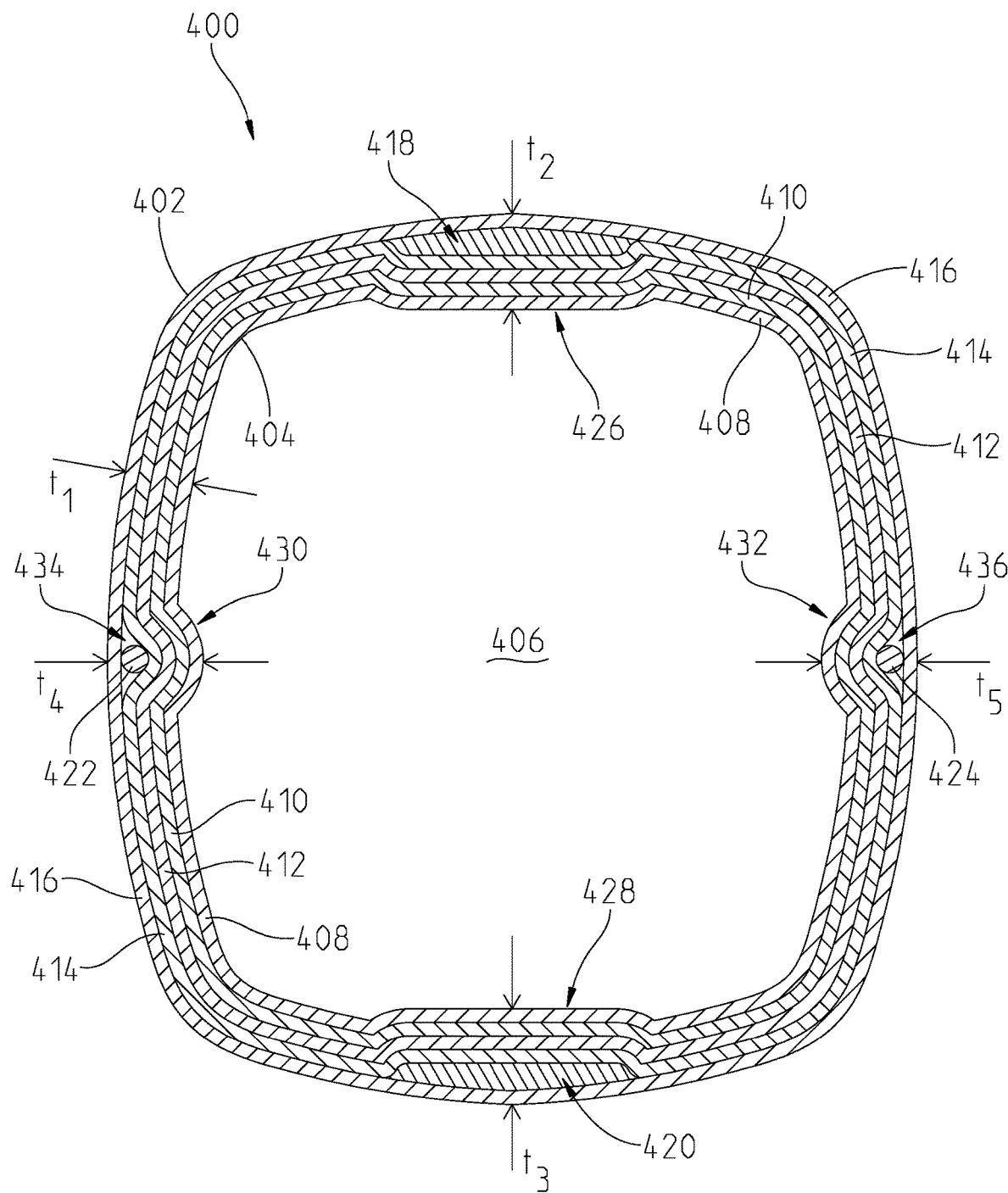
FIG. 4 is a cross-sectional view of another embodiment of the spray boom taken along line A-A of FIG. 2.

In FIG. 4, a different embodiment of a cross-sectional view of a boom frame 400 is shown. This boom frame 400 may be similar to that of FIG. 3, except additional passageways or channels are shown formed between layers. Here, the boom frame 400 may include an outer surface 402 and an inner surface 404, where the distance therebetween defines an overall thickness, $t_1$, of the boom frame 400. The boom frame 400 may be formed by a hand-laying process or other known process where a plurality of layers is stacked and molded to one another to form the carbon fiber boom. The plurality of layers may be formed of a carbon fiber or fiberglass material, and each layer may comprise a sheet of material.

In FIG. 4, the plurality of layers may include a first layer 408, a second layer 410, a third layer 412, a fourth layer 414, and a fifth layer 416. The first layer 408 may be the innermost layer that coincides with the inner surface 404, whereas the fifth layer 416 is the outermost layer that coincides with the outer surface 402. Although five layers are shown and described herein, it is contemplated that any number of layers may be used to form the boom frame 400.

As shown in FIG. 4, an area internal of the first layer 408 is an internal cavity. As such, the boom frame 400 may be substantially hollow as shown. Linking members such as wires, cables, hoses, pipes, and the like may be routed through the cavity as desired.

Similar to the boom frame 300 of FIG. 3, the boom frame 400 of FIG. 4 may include one or more channels (or passageways) defined between two of the plurality of layers. For example, the boom frame 400 may include a first channel 418, a second channel 420, a third channel 434, and a fourth channel 436. As shown, each channel is located at a different location or position of the boom frame. It may be desirable to have sufficient amount of material, i.e., layers, between each channel or passageway to uphold the integrity of the boom frame. For instance, the width of the first and second channels may be greater than the width of the third and fourth channels (as indicated in FIG. 4). The distance between the first channel 418 and the third and fourth channels is greater, however, than the overall width of each channel. The same is true with respect to the second, third and fourth channels.

In FIG. 4, a first linking member 422 such as a wire, tube, pipe, hose, cable or the like is shown routed through the third channel 434. This first linking member 422 may be routed along the entire length of the boom frame 400. Similarly, a second linking member 424 such as a wire, tube, pipe, hose, cable or the like is shown routed through the fourth channel 436. Although a similar member is not shown in the first and second channels, this is only one example and it is contemplated that each channel or passageway may include a linking member including a hose, wire, cable, pipe, tube, etc. routed therethrough.

It is also shown that the thickness of the boom frame 400 may increase at the location of each channel or passageway such that a bulge may be formed. In FIG. 4, for example, the first channel 418 may be formed in the boom frame 400 such that a first bulge 426 is formed. Here, the thickness, $t_2$, of the boom frame is greater than the overall thickness, $t_1$, of the boom frame 400. The first bulge 426 is shown as being formed internally of the boom frame 400. This, however, is shown only by way of a non-limiting example. The formed channel may cause a portion of the boom frame to bulge both internally and externally.

The thickness of the boom frame may also be greater at the locations of the second channel 420, the third channel 434, and the fourth channel 436. For instance, a second bulge 428 may be formed by the second channel 420, a third bulge 430 may be formed by the third channel 434, and a fourth bulge 432 may be formed by the fourth channel 436. The thickness, $t_3$, at the second channel 420, the thickness, $t_4$, at the third channel 434, and the thickness, $t_5$, at the fourth channel 436 may be greater than the overall thickness, $t_1$, of the boom frame. In one non-limiting example, the thickness at each channel may be at least 1.5 to 2.0 times the thickness of the overall thickness.

As described above, each of the boom frames shown in FIGS. 3 and 4 may be encapsulated or partially covered by a manifold which is coupled to the boom frame. Thus, each channel or passageway may terminate at the manifold. A connector or fitting may be provided on the manifold at the location of each channel or passageway in order to electrically, hydraulically, or pneumatically coupled adjacent boom frames to one another via the manifolds.

It is within the scope of this disclosure that there may be any number of passageways or channels formed in the boom frame. Each channel and passageway may be spaced from one another to provide structural integrity to the carbon fiber boom.

Figure 5:
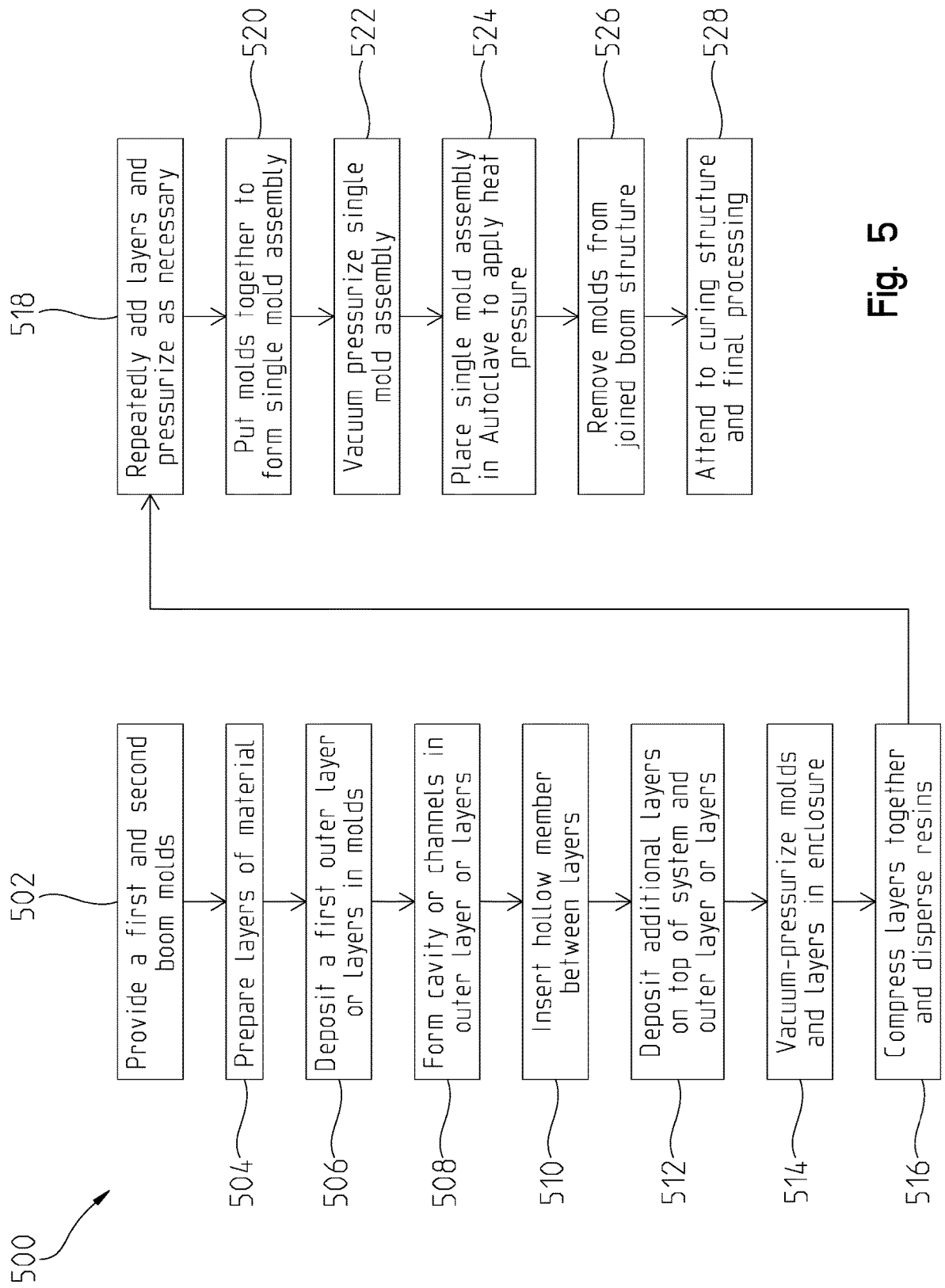
FIG. 5 is a flow diagram of one embodiment of a method of manufacturing a carbon fiber boom with integrated channels and passageways defined therein.

Turning to FIG. 5, one embodiment is provided of a method for manufacturing a carbon fiber boom in accordance with the present disclosure. In particular, this method provides a process for integrating the aforementioned channels or passageways into a composite, fiberglass or combination thereof during a hand-laying manufacturing process. The method 500 may include a plurality of blocks or steps for completing the boom. In FIG. 5, a plurality of blocks is shown as one example of this process. It is to be understood that the process may include fewer or additional blocks. Moreover, the arrangement or sequential order of the blocks depicted in FIG. 5 may differ for other embodiments.

In a first block 502 of FIG. 5, a first and second boom molds may be provided. The first boom mold may be designed as a "male" boom mold and the second mold may be designed as a "female" boom mold. In a second block 504, the material may be provided and prepared for the process. Here, material such as carbon fiber or fiberglass may be provided in sheets, for example. Alternatively, the material may be provided as woven fabric, rovings, or chopped strains with a resin material.

In a third block 506, a first outer layer or layers may be deposited or laid in one or both molds. While a hand-laying process is described herein, there may be other methods for placing the layers of material in the molds. Any known process may be used. Once the first outer layer or layers is placed in the mold(s), the method 500 may advance to block 508 where a cavity or channel may be formed. Here, the layers may be rounded for forming the channel or passageway. Alternatively, or in addition, in block 510 a hollow PVC or composite tube or pipe may be integrated between layers. A wire or cable may be later routed through the hollow tube or pipe. Additional layers may be added to the mold in block 512 on top of first laid layers. The channels or passageways formed in block 508 may be formed the entire length of the boom mold. Moreover, each channel or passage formed inbetween layers may be spaced from adjacent channels or passages by a desired distance to provide structural integrity to the boom.

Once block 512 is completed, the method may advance to block 514 where the molds may be vacuum-pressurized in an enclosure. In one example, each mold may be placed in a bag and then vacuum-pressurized. During this process, the layers may be compressed together and resins dispersed between layers in block 516. The bag or enclosure may be removed after block 516 is executed. In block 518, additional layers may be added to each mold, and blocks 514 and 516 may be repeated as necessary.

Once the first and second molds have the desired amount of layers, the method 500 advances to block 520 where the molds are assembled to one another to form a single mold assembly. The single mold assembly may be vacuum-pressurized in block 522. The entire mold may also be placed in an Autoclave in block 524 and heat pressure is applied to the mold. The heat pressure may further join the two molds together. After block 524 is completed, the method 500 may advance to block 526 where the molds are removed from the newly formed boom structure. The formed boom structure in block 526 may have a shape of the two molds, and further curing and final processing may be executed in block 528 to form the final carbon fiber boom.

The carbon fiber boom is now formed with the integrated channels or passageways formed between the stacked layers of composite material. Although not shown in FIG. 5, wires, cables, pipes, hoses, and the like may now be routed through the internally formed channels. Moreover, if manifolds are desired, a manifold may be coupled to each end of the carbon fiber boom. The wires, cables, pipes, hoses, etc. may be coupled to the manifold so that adjacent boom frames may be coupled electrically, hydraulically, pneumatically or a combination thereof.

In view of the above, a carbon fiber boom or boom frame may be manufactured with integrated channels or passages to allow cables, hoses, wires, tubes, and the like to pass through the internal channels without being routed and coupled externally to the boom. The addition of jumper cables, wires, or piping may be necessary to couple adjacent boom frames to one another, and an example of this is shown in FIG. 2. By removing the wires, cables, pipes and plumbing externally of the boom, a machine operator may have improved visibility from the cab of the machine, and the overall weight of the machine may be reduced.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A method of manufacturing a carbon fiber boom, the method comprising:
   providing a first boom mold and a second boom mold;
   placing at least a first layer of carbon material in the first boom mold and the second boom mold;
   adding at least a second layer of carbon material in the first boom mold and the second boom mold;

forming a first elongated channel in between the first layer and the second layer of carbon material in one of the first boom mold and the second boom mold;

pressurizing the first and second boom molds to compress the first and second layers of carbon material together;

assembling the first and second boom molds together to form a single mold assembly; and applying heat pressure to the single mold assembly to form the carbon fiber boom;

wherein forming the first elongated channel comprises inserting a hollow tube between the first and second layers of carbon material.

2. The method of claim 1, further comprising forming a second elongated channel in between the first and second layers of carbon material at a location spaced circumferentially from the first elongated channel.

3. The method of claim 1, further comprising:

depositing a plurality of layers of carbon material in the first and second boom molds; and forming one or more channels between any two of the plurality of layers of carbon material.

4. The method of claim 3, wherein the plurality of layers includes a third layer of carbon material and a fourth layer of carbon material, and wherein the third and fourth layers of carbon material are different from the first and second layers of carbon material.

5. The method of claim 1, wherein pressurizing the first and second boom molds comprises compressing the first and second layers of carbon material together and dispersing resins.

6. The method of claim 1, further comprising:

adding layers of carbon material to the first and second boom molds after pressurizing the first and second boom molds; and pressurizing the added layers to compress the added layers together.

7. The method of claim 1, further comprising routing a member through the first elongated channel after applying heat pressure to the single mold assembly, wherein the member electrically, hydraulically, or pneumatically couples a first end of the carbon fiber boom to a second end thereof.

8. The method of claim 1, further comprising fabricating a thickness of the carbon fiber boom between an inner surface and outer surface thereof, wherein the thickness is greater at a location of the first elongated channel than at a location free of the channel.

9. A method of manufacturing a carbon fiber boom, the method comprising:

placing a plurality of layers of carbon material in one or more boom molds, wherein the plurality of layers of carbon material include an outermost layer, an innermost layer, and a first intermediate layer arranged between the outermost layer and the innermost layer;

forming a first elongated channel in between the outermost layer and the first intermediate layer in the one or more boom molds; and applying pressure to the one or more boom molds to compress the plurality of layers of carbon material together to form the carbon fiber boom;

wherein, the outermost layer of the plurality of layers is placed in the one or more boom molds before the innermost layer of the plurality of layers.

10. The method of claim 9, further comprising forming a second elongated channel in between the outermost layer and the first intermediate layer that is spaced from the first elongated channel.

11. The method of claim 10, further comprising forming a third elongated channel in between the outermost layer and the first intermediate layer that is spaced from the first and second elongated channels.

12. The method of claim 11, further comprising forming a fourth elongated channel in between the outermost layer and the first intermediate layer that is spaced from the first, second, and third elongated channels.

13. The method of claim 12, further comprising:

forming a first thickness between the outermost layer and the innermost layer at a location absent the first elongated channel, the second elongated channel, the third elongated channel, and the fourth elongated channel;

forming a second thickness between the outermost layer and the innermost layer at a location of the first elongated channel;

forming a third thickness between the outermost layer and the innermost layer at a location of the second elongated channel;

forming a fourth thickness between the outermost layer and the innermost layer at a location of the third elongated channel; and forming a fifth thickness between the outermost layer and the innermost layer at a location of the fourth elongated channel.

14. The method of claim 13, wherein each of the second thickness, the third thickness, the fourth thickness, and the fifth thickness is at least 1.5 times greater than the first thickness.

15. The method of claim 14, wherein each of the second thickness, the third thickness, the fourth thickness, and the fifth thickness is at least 2.0 times greater than the first thickness.

16. The method of claim 10, wherein the plurality of layers of carbon material include a second intermediate layer arranged between the first intermediate layer and the innermost layer and a third intermediate layer arranged between the second intermediate layer and the innermost layer.

17. A method of manufacturing a one-piece carbon fiber boom, the method comprising:

arranging a plurality of layers of carbon material in one or more boom molds, wherein the plurality of layers of carbon material include an outermost layer, an innermost layer, and a first intermediate layer positioned between the outermost layer and the innermost layer;

forming a first elongated channel in between the outermost layer and the first intermediate layer in the one or more boom molds; and applying pressure to the one or more boom molds to compress the plurality of layers of carbon material together to form the one-piece carbon fiber boom;

wherein the innermost layer forms an internal cavity;

wherein at least the innermost layer and the first intermediate layer of the plurality of layers separates the first elongated channel from the internal cavity.

18. The method of claim 17, wherein the plurality of layers of carbon material include a second intermediate layer arranged between the first intermediate layer and the innermost layer and a third intermediate layer arranged between the second intermediate layer and the innermost layer.

19. The method of claim 17, further comprising:

forming a second elongated channel in between the outermost layer and the first intermediate layer that is spaced from the first elongated channel;

forming a third elongated channel in between the outermost layer and the first intermediate layer that is spaced from the first and second elongated channels; and forming a fourth elongated channel in between the outermost layer and the first intermediate layer that is spaced from the first, second, and third elongated channels.

20. The method of claim 17, further comprising routing a member through the first elongated channel after applying pressure to the one or more boom molds, wherein the member electrically, hydraulically, or pneumatically couples a first end of the carbon fiber boom to a second end thereof.

\* \* \* \* \*